United States Patent
Kumar et al.

(10) Patent No.: US 12,130,927 B2
(45) Date of Patent: Oct. 29, 2024

(54) INCREMENTAL REGULATORY COMPLIANCE

(71) Applicant: International Business Machines Corporation, Armonk, NY (US)

(72) Inventors: Arun Kumar, Noida (IN); Sneha Mondal, Bengaluru (IN); Simon Metson, Bristol (GB); Mandy Hinton, Bradenton, FL (US)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 17/186,445

(22) Filed: Feb. 26, 2021

(65) Prior Publication Data

US 2022/0277082 A1 Sep. 1, 2022

(51) Int. Cl.
*G06F 21/57* (2013.01)
*G06F 16/2457* (2019.01)
*G06F 16/248* (2019.01)
*G06F 16/93* (2019.01)
*G06N 20/00* (2019.01)

(52) U.S. Cl.
CPC ...... *G06F 21/577* (2013.01); *G06F 16/24578* (2019.01); *G06F 16/248* (2019.01); *G06F 16/93* (2019.01); *G06N 20/00* (2019.01); *G06F 2221/034* (2013.01)

(58) Field of Classification Search
CPC ............. G06F 21/577; G06F 16/24578; G06F 16/248; G06F 16/93; G06F 2221/034; G06N 20/00; H04L 63/20
See application file for complete search history.

(56) References Cited

U.S. PATENT DOCUMENTS

| | | | |
|---|---|---|---|
| 11,354,502 B2* | 6/2022 | Kenkre | G06F 16/93 |
| 2008/0209504 A1* | 8/2008 | Bonn | H04L 63/0263 726/1 |
| 2018/0053128 A1* | 2/2018 | Costas | G06Q 50/18 |
| 2018/0189797 A1 | 7/2018 | Ravi | |

(Continued)

OTHER PUBLICATIONS

Mell, Peter, et al., The NIST Definition of Cloud Computing, National Institute of Standards and Technology, U.S. Department of Commerce, NIST Special Publication 800-145, Sep. 2011.

(Continued)

*Primary Examiner* — Han Yang
(74) *Attorney, Agent, or Firm* — Ryan, Mason & Lewis, LLP

(57) ABSTRACT

Methods, systems, and computer program products for incremental regulatory compliance are provided herein. A computer-implemented method includes obtaining at least one first document indicative of a first set of requirements, at least one second document indicative of a second set of requirements, and a baseline document indicative of one or more security controls currently implemented in a system architecture; performing a document comparison between the at least one first document, the at least one second document, and the baseline document to identify overlapping requirements across the first set and the second set that are not satisfied by the one or more security controls; and recommending at least one additional security control to be implemented in said system architecture for satisfying at least one of the identified overlapping requirements.

20 Claims, 11 Drawing Sheets

(56) References Cited

U.S. PATENT DOCUMENTS

| | | |
|---|---|---|
| 2018/0253367 A1 | 9/2018 | Stabnow et al. |
| 2020/0050620 A1* | 2/2020 | Clark ................ G06F 16/24578 |
| 2020/0111023 A1* | 4/2020 | Pondicherry Murugappan ........... G06N 5/02 |
| 2020/0125648 A1* | 4/2020 | Jiang ....................... G06F 16/93 |
| 2021/0357392 A1* | 11/2021 | Bulut .................... G06Q 50/26 |

OTHER PUBLICATIONS

Semantic Textual Similarity Wiki, available at http://ixa2.si.ehu.eus/stswiki/index.php/Main_Page, last modified Oct. 8, 2018.

Budanitsky, Alexander, et al., Evaluating WordNet-based Measures of Lexical Semantic Relatedness, Computational linguistics. Mar. 1, 2006;32(1):13-47.

Mabotuwana T., et al. An ontology-based similarity measure for biomedical data—Application to radiology reports. Journal of biomedical informatics. Oct. 1, 2013;46(5):857-68.

Liu, Yinhan, et al., RoBERTa: A Robustly Optimized BERT Pretraining Approach. arXiv preprint arXiv:1907.11692. Jul. 26, 2019.

Lan, Zhenzhong, et al., Albert: A lite bert for self-supervised learning of language representations. arXiv preprint arXiv:1909.11942. Sep. 26, 2019.

Cer, Daniel, et al., Universal sentence encoder. arXiv preprint arXiv:1803.11175. Mar. 29, 2018.

Conneau, Alexis, et al., Supervised learning of universal sentence representations from natural language inference 8 data. arXiv preprint arXiv:1705.02364. May 5, 2017.

* cited by examiner

US 12,130,927 B2

INCREMENTAL REGULATORY COMPLIANCE

FIELD

The present application generally relates to information technology and, more particularly, to incremental regulatory compliance.

BACKGROUND

There is a growing number of compliance frameworks that set forth requirements (or best practices) to protect how data is handled and stored in information technology (IT) systems. Generally, these requirements are set forth in complex documents, and implementing such requirements can take months, if not years. Further, a given IT system may need to comply with multiple compliance frameworks having overlapping requirements. In such a situation, software developers often address the compliance frameworks individually and ignore the overlapping requirements. This is not only inefficient but can lead to the system being less secure for prolonged period times.

SUMMARY

In one embodiment, techniques for incremental regulatory compliance are provided. An exemplary computer-implemented method can include obtaining at least one first document indicative of a first set of requirements, at least one second document indicative of a second set of requirements, and a baseline document indicative of one or more security controls currently implemented in a system architecture; performing a document comparison between the at least one first document, the at least one second document, and the baseline document to identify overlapping requirements across the first set and the second set that are not satisfied by the one or more security controls; and recommending at least one additional security control to be implemented in said system architecture for satisfying at least one of the identified overlapping requirements.

Another embodiment, or elements thereof, can be implemented in the form of a computer program product tangibly embodying computer readable instructions which, when implemented, cause a computer to carry out a plurality of method steps, as described herein. Furthermore, another embodiment, or elements thereof, can be implemented in the form of a system including a memory and at least one processor that is coupled to the memory and configured to perform noted method steps. Yet further, another embodiment of the invention or elements thereof can be implemented in the form of a means for carrying out the method steps described herein, or elements thereof; the means can include hardware module(s) or a combination of hardware and software modules, wherein the software modules are stored in a tangible computer-readable storage medium (or multiple such media).

These and other objects, features and advantages of the present invention will become apparent from the following detailed description of illustrative embodiments thereof, which is to be read in connection with the accompanying drawings.

DETAILED DESCRIPTION

As noted herein, a regulatory document sets forth security best practices (or requirements), which can be time-consuming to implement. Generally, compliance teams need to analyze the document to determine the requirements and their impact on existing systems and policies, and to identify and implement any changes that are needed to comply with the document. Additionally, if an existing compliance infrastructure is already in place, then it is important to understand how much of that infrastructure applies to the regulation being considered. The term "increment compliance" as used herein refers to the residual actions that are needed so that the existing infrastructure complies with the regulation being considered.

One approach to address incremental compliance includes considering each regulation independently, however, this approach ignores any overlap between two regulations. Another approach involves a subject matter expert (SME) performing a manual analysis of overlapping regulations. The regulation documents are long and complex. For example, such documents are often hundreds of pages that includes thousands of requirements. As such, it can take a significant amount of time to review such documents and formulate an incremental compliance plan.

As described herein, embodiments of the present disclosure include improved techniques for incremental regulatory compliance and can reduce the time that is needed to update a system so that it complies with security best practices. Efficient implementation of such practices improves the security of the overall system by reducing the time the system is exposed to potential risks.

As used herein, the term "regulatory document" generally refers to a document comprising at least one regulation, and the term "baseline document" refers to a document that is common to at least two regulatory documents such that a coarse mapping exists between each of the at least two regulatory documents and the baseline document. A coarse mapping generally refers to a mapping of requirements from each of the regulatory documents to elements in the baseline document that satisfy those requirements. Such coarse mapping may be defined by an SME, for example.

A security control generally refers to a description of how an organization can meet the requirement. The implementation of a security control refers to the actual implementation, code, or configuration so that the requirement is met. By way of example, a requirement may set forth that all sensitive data should be protected at rest. The security control may then set forth specify that all data should be classified as sensitive or non-sensitive data; and sensitive data should be encrypted while stored in a database or disk. The security control implementation in this example may include software deployed that identifies columns with sensitive data in a MySQL DB and uses 128-bit RSA encryption to protect that data, where the key is safeguarded through a secure keystore.

Figure 1:
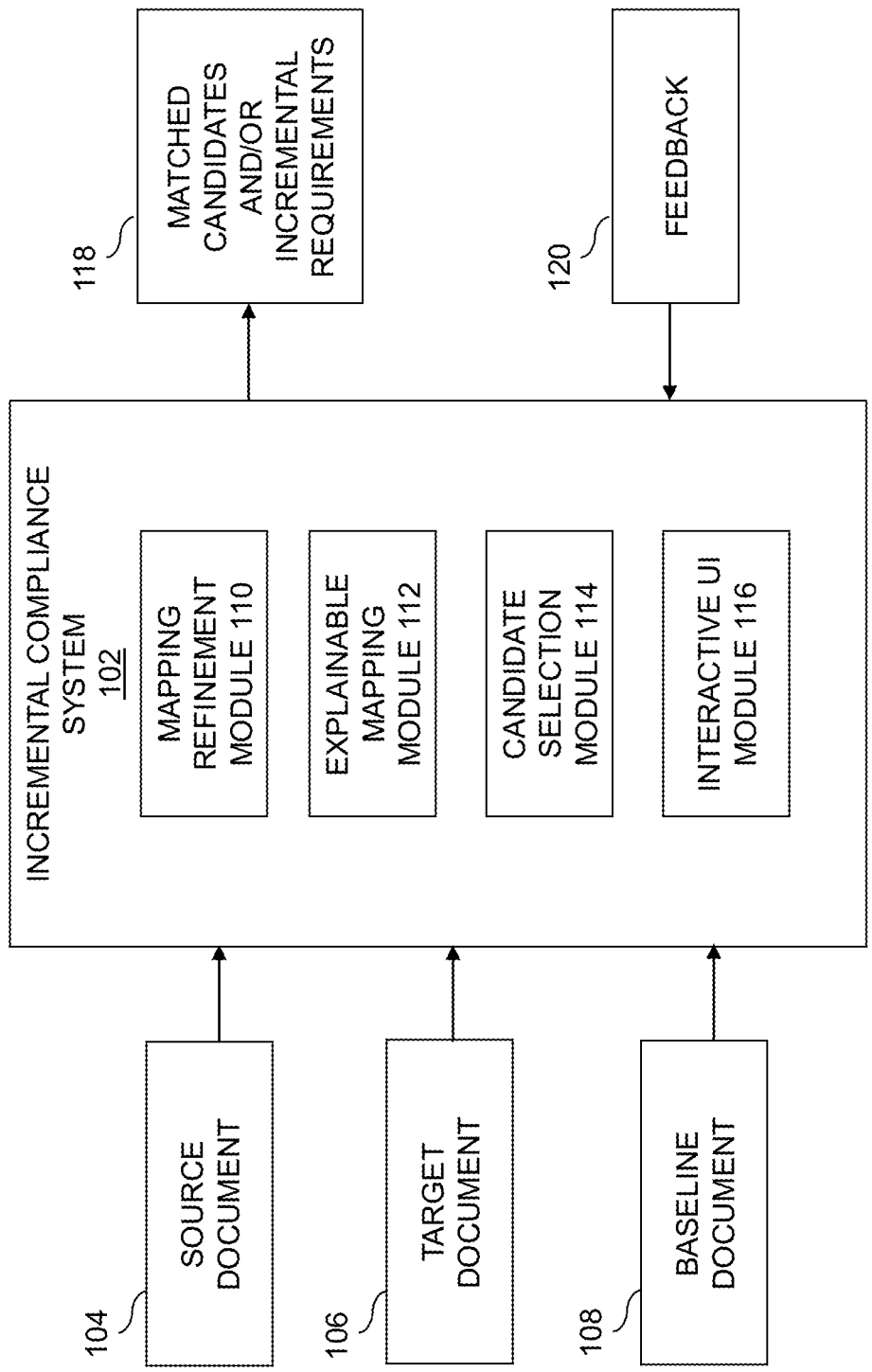
FIG. 1 is a diagram illustrating a system architecture, according to an exemplary embodiment of the invention.

FIG. 1 is a diagram illustrating a system architecture, according to an example embodiment. By way of illustration, FIG. 1 depicts an incremental compliance system 102 that includes a mapping refinement module 110, an explainable mapping module 112, a candidate selection module 114, and an interactive user UI (user interface) module 116. In the FIG. 1 embodiment, the incremental compliance system 102 obtains a source document 104, a target document 106, and a baseline document 108. As a non-limiting example, the baseline document 108 may be associated with a first regulatory document (e.g., National Institute of Standards and Technology (NIST) document), the source document 104 may be associated with to a second regulatory document (e.g., Health Information Trust Alliance (HITRUST) document), and the target document 106 may be associated with a third regulatory document (e.g., a System and Organization Controls 2 (SOC2) document).

Generally, the incremental compliance system 102 performs a 3-tuple document comparison between the documents 104, 106 and the baseline document 108. The 3-tuple comparison identifies the requirements that are common to both documents 104, 106 and that are covered by elements (e.g., security controls) set forth in the baseline document. It is to be appreciated that such embodiments are scalable and may be expanded to an n-tuple document comparison. In such a case, there could be a set of multiple documents that represent currently implemented requirements and a second set of documents that represent new requirements that are to be checked for intersection with implemented ones.

In at least some example embodiments, the incremental compliance system 102 may output the baseline document 108 to a user using its interactive UI (user interface) module 116 to obtain coarse grained mappings, as described in more detail in conjunction with FIG. 2 below, for example. The mapping refinement module 110 refines the coarse mappings associated with the regulatory documents 104, 106 and the baseline document 108 based on structural, syntactic, and semantic properties. The explainable mapping module 114 recommends one or more refined mappings using semantic and ontological properties of the corresponding document elements. For example, the explainable mapping module 114 may annotate the refined mappings using operators such as 'exact', 'subset', 'superset', 'equivalent', etc. The candidate selection module 114 performs a set analysis with respect to the refined mappings to obtain matching candidates across the documents 104, 106 and identify incremental requirements.

The interactive UI module 116 may output the matched candidates and identified incremental requirements 118 from the candidate selection module 114, and receive input from a user to accept, reject, and/or refine such output. Additionally, the interactive UI module 116 may also provide a feedback mechanism 120 to refine the recommendation steps for future comparisons based on user input.

Figure 2:
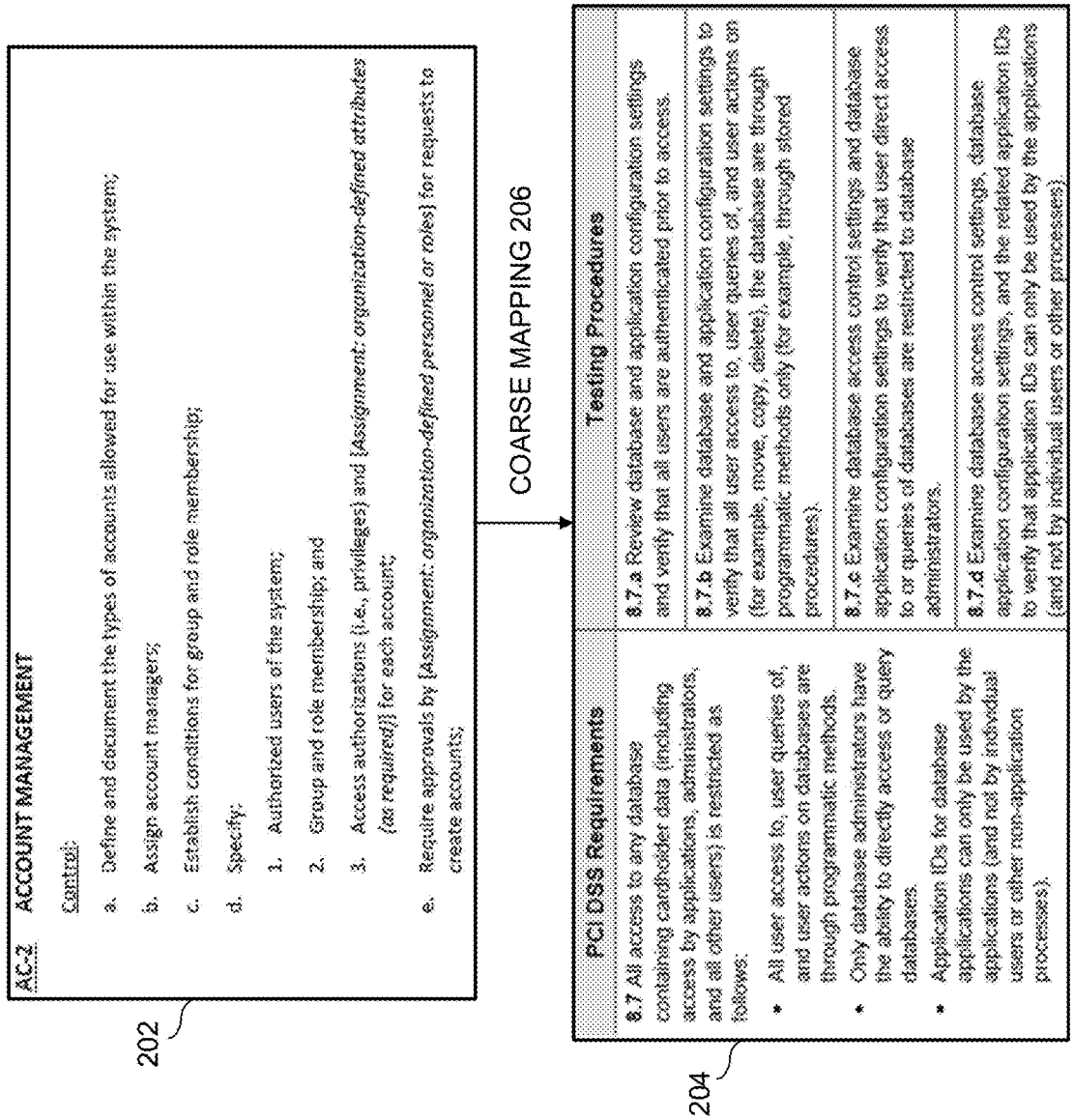
FIG. 2 is a diagram illustrating a coarse-grained mapping between two documents, according to an exemplary embodiment.

FIG. 2 is a diagram illustrating an example of a coarse-grained mapping between two documents according to an exemplary embodiment. A coarse mapping 206 is defined between a portion of a first document 202 and a portion of a second document 204, which correspond to section "AC-2" and section "8.7", respectively. It is to be appreciated that the coarse mapping 206 does not specifically map the sub-sections defined in the first document 202 (e.g., subject section a through e) to parts of the second document 204. As such, these types of coarse-grained mappings are generally specified at a control level and lack granularity. However, the controls themselves are well-structured (e.g., have sub-controls, sub-sub-controls, etc.).

An example embodiment includes performing a process for determining fine-grained mappings based on specified coarse-grained mappings. Such a process can be performed at least in part by mapping refinement module 110, for example, and may include expanding the controls into constituent sub-controls. As an example, expanding the controls may be performed based at least in part on automated text extraction up to a specified desired of granularity. Next, the pairwise similarities are computed based on, for example, semantic properties (e.g., word embeddings and sentence encoder similarities), domain-specific properties (e.g., embedding models trained on regulatory data), and ontological properties (e.g., if token1 belongs in the synset of token2 assign relatively higher score). The pairwise similarity may correspond to a composite score (e.g., a weighted average of semantic and ontology based scores). Additionally, the process may include performing pruning and matching on a specified number of top scores.

Figure 3:
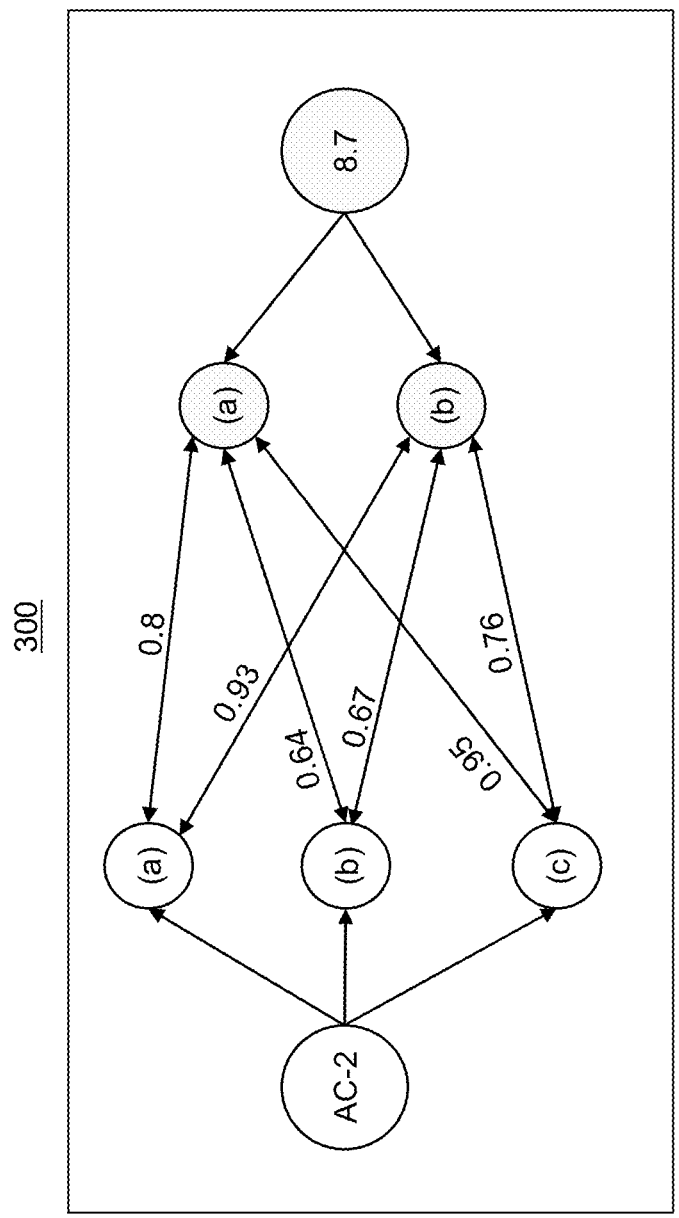
FIG. 3 is a diagram showing techniques for determining fine-grained mappings, according to an exemplary embodiment.

FIG. 3 is a diagram showing techniques for determining fine-grained mappings, according to an exemplary embodiment. FIG. 3 includes a graph 300 that refines the coarse mapping 206 from FIG. 2 to generate fine-grained mappings between subsections of the first and second documents. Specifically, the graph 300 indicates that section AC-2 from the first document 202 includes three sub-sections, namely, (a), (b), and (c); and section 8.7 from document 204 includes two sub-sections, namely, (a) and (b). The graph 300 also includes pairwise similarities that were computed for all pairs of the subsections. Based on the graph 300, the fine-grained mappings can be determined. For example, fine-grained mappings between AC-2(a) and 8.7(b), and AC-2(c) and 8.7(a) can be determined based on the computed pairwise similarities. Additionally, it can be determined that AC-2(b) is not mapped to another section as the pairwise similarities lower relative to the other pairwise similarities. For example, computed pairwise similarities can be ignored based on a threshold value. In some examples, a subsection in one document may be mapped to multiple subsections in another document.

Regulatory documents are often verbose, and controls can be written at different levels of granularity. Mapped controls may address the same topic but might differ in how prescriptive they are and/or differ in the exact requirements. Accordingly, one or more exemplary embodiments annotate the fine-grained mappings with explanations. Such explanations may be determined by performing a dependence parsing process to obtain part of speech tags and a rule-based noun-phrase extraction process on each text. Then the extracted segments can be compared using an ontology based on the relationships between such segments (such as, for example, "is-a", "has-a", inverse "is-a" relationships). The text segments that contribute to similarity are aligned and each aligned segment is annotated with a label. As an example, assume there is a coarse-grained mapping between the text, "New employees are subject to employment verification (criminal background and proof of identity) checks in consideration of and subject to local law and standard practices," and "Background verification checks on all candidates for employment, contractors, and third-party users shall be carried out in accordance with relevant laws. Applicants may require screening in the following areas: 1. health screening; 2. drug use record; and 3. motor vehicle license." In such an example, the text segment [new employees] can be extracted and mapped to [candidates of employment], and this alignment can be labeled as being identical. Additionally, the text segments [employment verification] and [local law] can be extracted and mapped to [background verification] and [relevant laws], respectively, and each of these can be labeled as being equivalent. Those skilled in the art will appreciate other text segments from this example can be extracted, mapped, and labelled in a similar manner.

Figure 4:
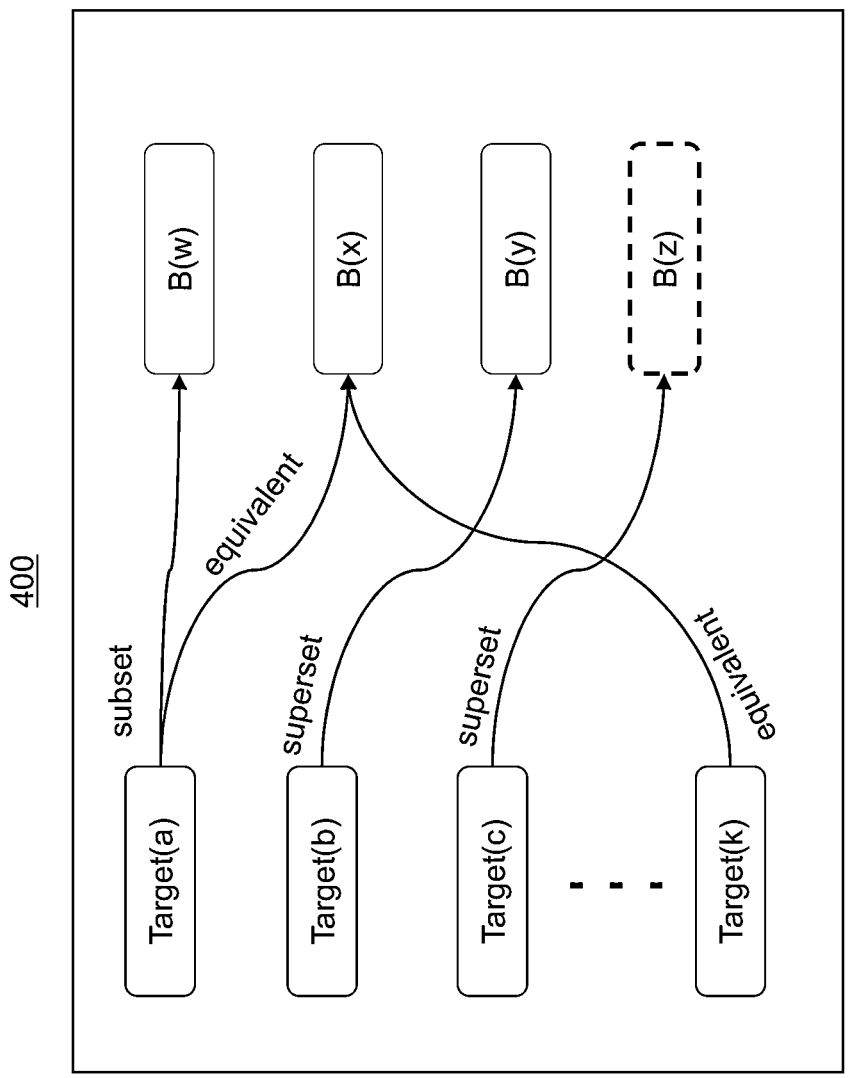
FIG. 4 is a diagram illustrating a graph showing relationships between a baseline document and a target document, according to an exemplary embodiment.

FIG. 4 is a diagram illustrating a graph 400 showing relationships between a baseline document and a target document, according to an exemplary embodiment. The graph 400 may be determined based on fine-grained, annotated mappings between the baseline document 108 and the target document 106, for example. In the example shown in FIG. 4, the graph 400 includes a number of requirements of the target document (denoted as Target(a), Target(b), Target (c), Target(k)) that are mapped to a set of controls corresponding to the baseline document. The graph 400 indicates that control B(z) is not currently implemented by the system architecture as shown by the dashed border, whereas controls B(w), B(x), and B(y) are currently implemented by a system architecture.

The following information may be extracted from the graph 400 to determine how well existing controls cover the requirements set forth in the target document:

Target(a) is fully covered by B(x) and B(w)
Target(b) is partially covered by B(y)
Target(k) is fully covered by B(x)

The following information can also be extracted from the graph 400 to determine the incremental compliance measures that must be taken in order to comply with the requirements in the target document:

Target(c) is not covered.
Target(c) is a superset of B(z). Implementing B(z) partially covers Target(c)

As such, the annotations on the edges of the incremental graph ("subset", "superset", "equivalent") can be exploited to arrive at actionable insights and/or recommendations, and these can be output to a user.

Figure 5:
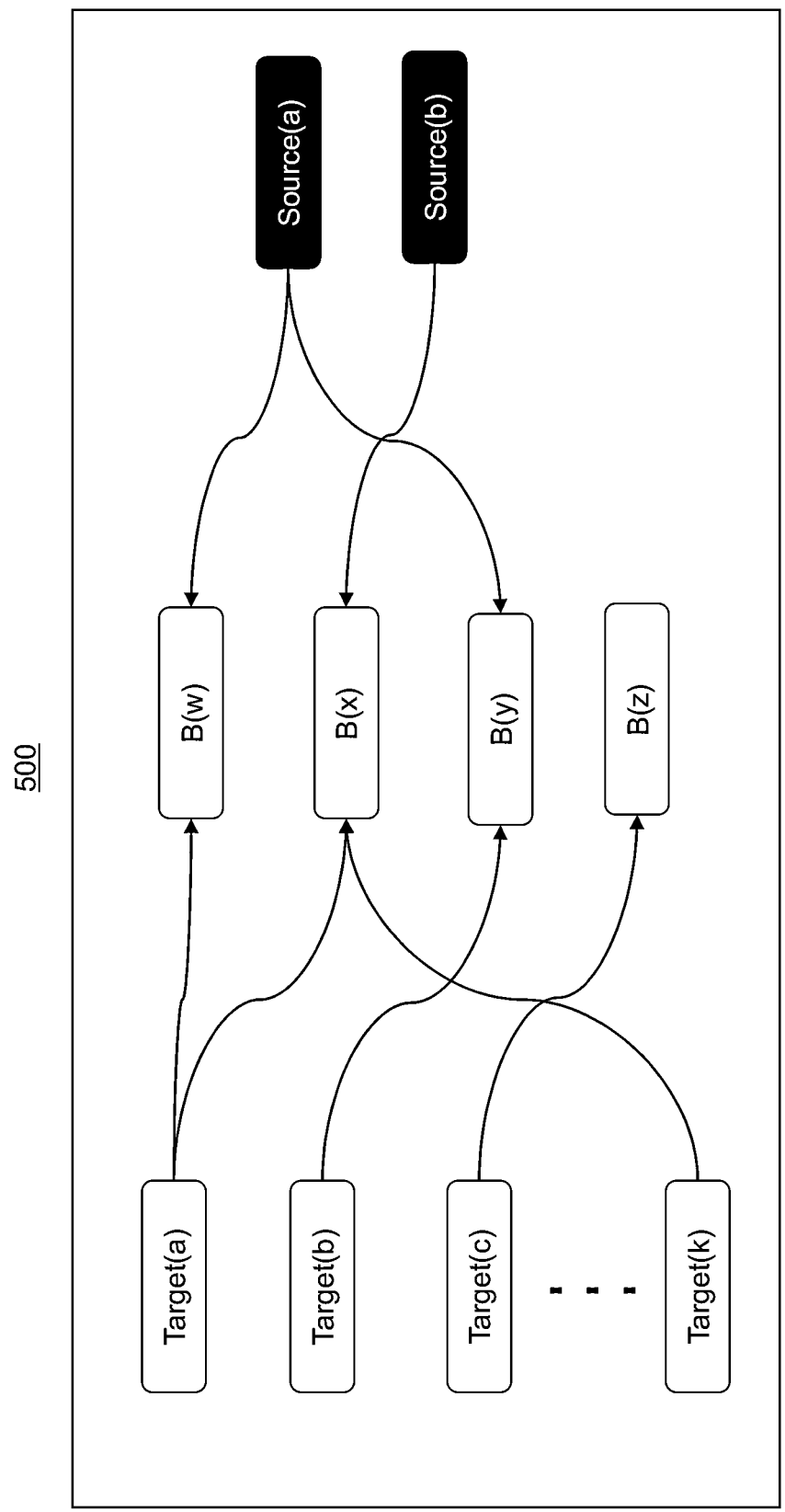
FIG. 5 is a diagram illustrating a graph showing mapping between a source document and a target document via a baseline document, according to an exemplary embodiment.

FIG. 5 is a diagram illustrating a graph 500 showing mapping between a source document and a target document via a baseline document, according to an exemplary embodiment of the invention. For example, the graph 500 may represent the fine-grained annotated mappings from: the source document 104 to the baseline document 108, and (ii) the target document 106 to the baseline document 108. The mappings in graph 500 can be exploited to determine how well the requirements of the source document 104 serve the requirements of the target document 106. It is noted that direct mappings between the source document 104 and the target document 106 are not known, and so this determination is made using the baseline document 108 as a pivot. Specifically, each requirement in the target document in graph 500 (represented as Target(a), Target(b), Target(c), Target(k)) is compared against every source requirement that it links to, via the baseline controls. As an example, Target(a) is compared with Source(a) via B(w) and Source (b) via B(x).

As noted above, the edge-labels are derived by aligning and annotating text segments (e.g., noun phrases) between pairs of requirements in the source document and target document. This can lead to various situations, such as, for example:

A target requirement and a source requirement are both subsets of a baseline control. In this situation, if the source requirement and the target requirement map to the same segments in the baseline document, then the target requirement is considered to fully cover the source requirement; otherwise, the target requirement partially covers (e.g., segments overlap) or does not cover (segments are disjoint) the source requirement.

A source requirement is a subset of a baseline control, and a target requirement is equivalent to the baseline control. In this situation, the source requirement, by transitivity, is also a subset of the target requirement. Thus, the target requirement increments over the source requirement.

A source requirement is a superset of a baseline control, and a target requirement is equivalent to the baseline control. In this situation, the target requirement is fully covered by the source requirement since the baseline control and the target requirement are equivalent.

It is to be appreciated that a given triplet (target requirement, baseline control, source requirement) may be interpreted based on the annotations on the connecting edges. In at least some embodiments, the interactive UI module 116 is configured to provide a rendering that compares the extent of overlap across controls.

Figure 6:
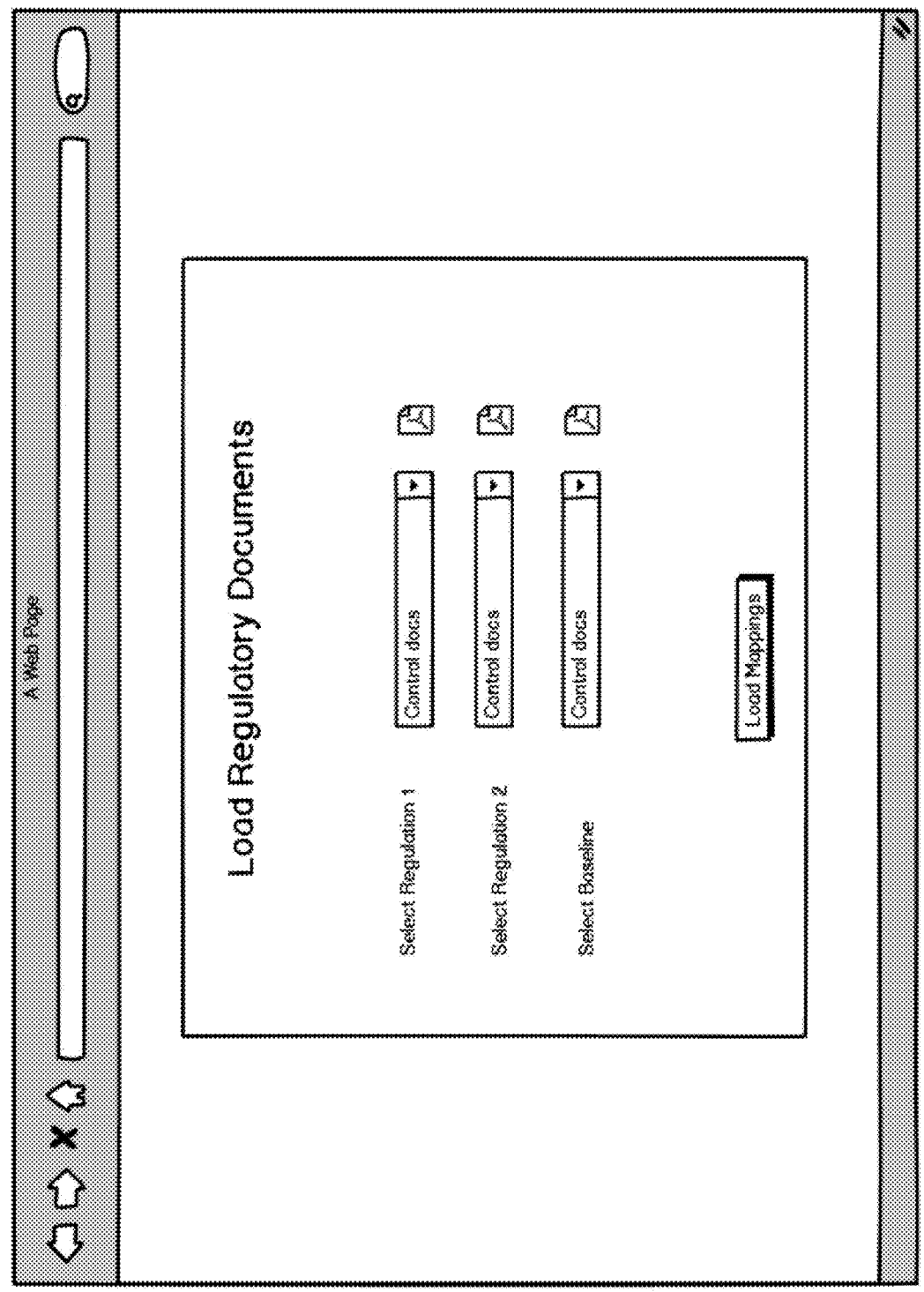
FIGS. 6-7 show aspects of a graphical user interface, in accordance with exemplary embodiments.

FIG. 6 show a screenshot 600 of an interactive UI, according to an exemplary embodiment. The screenshot 600 provides selection boxes to select a first regulation, a second regulation, and a baseline. Once selected, a user may view the text corresponding to each document (e.g., pdf or word document loaded from a database) within the interactive UI. In at least some embodiments, the documents are sequentially selected such that the "Select Baseline" dropdown displays documents having mappings to both of the selected regulation documents.

Figure 7:
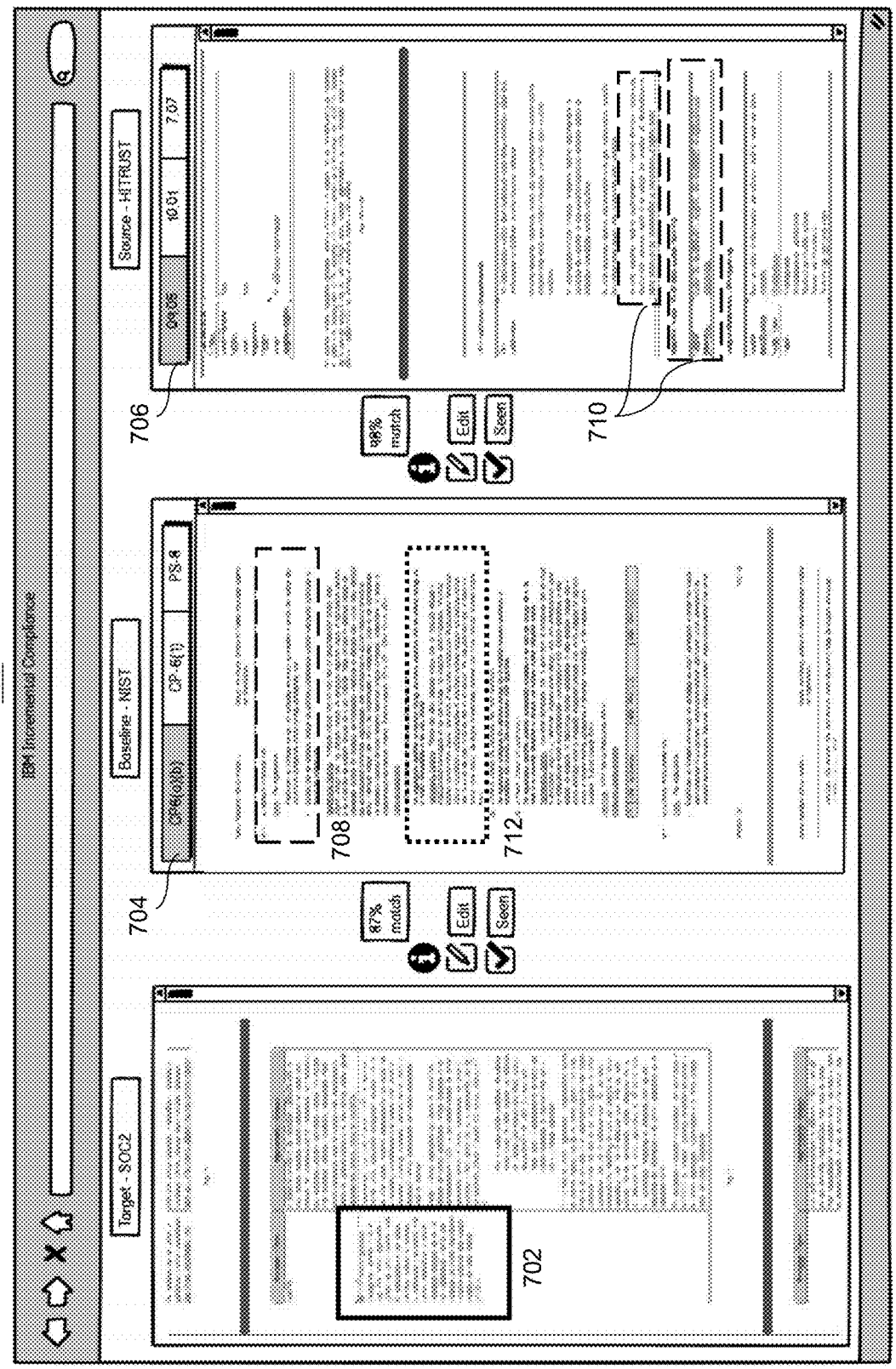

Referring also to FIG. 7, this figure shows another screenshot 700 of the interactive UI in accordance with an example embodiment. The screenshot 700 can be rendered in response to selecting the documents from the screenshot 600, for example. The screenshot 700 shows a side-by-side view including the target document, a baseline document, and a source document, which in this example correspond to a SOC2 document, a NIST document, and a HITRUST document, respectively.

As can be seen, screenshot 700 enables a user (e.g., an SME) to select a particular control of interest from the target document as indicated by box 702. The interactive UI outputs recommended annotated, fine-grained mappings to the baseline document related to this selection, as indicated by reference numerals 704 and 706. The user may then jump to mapped controls or scroll through each of the documents, for example. In at least some examples, the interactive UI may display indications of which controls that are mapped to the selected target control have already been implemented. For example, box 708 indicates that a first control is mapped to the target control corresponding to box 702, and box 712 indicates that a second control is mapped to the target control corresponding to box 702. Additionally, the interactive UI may indicate the corresponding source requirement that is covered by the implemented control. For example, in screenshot 700, boxes 710 correspond to a requirement in the source document that is covered by the control corresponding to box 708. The interactive UI may also show additional information about each mapping (e.g., mappings between the source document and the baseline document, and mappings between the target document and the baseline document). For example, in screenshot 700, the additional information includes a similarity score, an option to edit the selection of the mappings, and option to mark a particular control as seen. It is to be appreciated that screenshots 600, 700 are merely examples and are not intended to be limiting.

Figure 8:
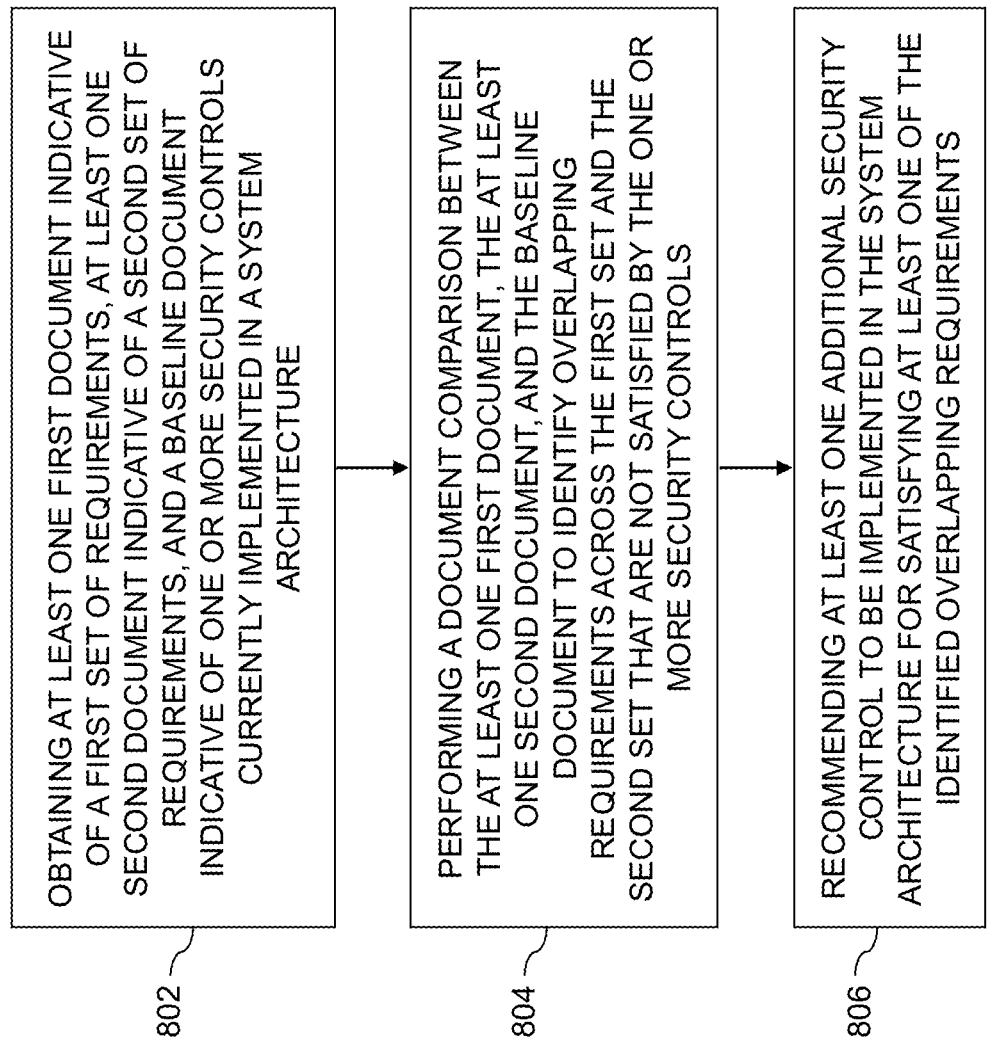
FIG. 8 is a flow diagram illustrating techniques according to an embodiment of the invention.

FIG. 8 is a flow diagram illustrating techniques according to an embodiment of the present invention. Step 802 includes obtaining at least one first document indicative of a first set of requirements, at least one second document indicative of a second set of requirements, and a baseline document indicative of one or more security controls currently implemented in a system architecture. Step 804 includes performing a document comparison between the at least one first document, the at least one second document, and the baseline document to identify overlapping requirements across the first set and the second set that are not satisfied by the one or more security controls. Step 806 includes recommending at least one additional security control to be implemented in said system architecture for satisfying at least one of the identified overlapping requirements.

The performing in step 804 may include obtaining coarse-grained mappings between portions of the baseline document and portions of each of the at least one first document and the at least one second document, wherein each of the coarse-grained mappings is between text related to at least one of the security controls and text related to at least one of the requirements in either the first set or the second set; and generating one or more fine-grained mappings for each of the coarse-grained mappings based on one or more properties extracted from each of the at least one first document, the at least one second document, and the baseline document, wherein the one or more properties comprise at least one of: one or more structural properties, one or more syntactic properties, and one or more semantic properties, and wherein each of the fined-grained mappings corresponds at least to one or more sub-controls of the corresponding security control. The performing may also include: computing pairwise similarity scores for each of the fined-grained mappings based at least in part on the one or more properties; and aligning the first document and the second document based at least in part on said pairwise similarity scores. The aligning may include performing a bipartite matching algorithm. Generating the fine-grained mappings may include: annotating a given one of the fine-grained mappings to specify a relationship between the portions of the baseline document and the portions of the at least one first document or the at least one second document that correspond to the given fine-grained mapping. The relationship may correspond to a least one of: an exact relationship; a subset relationship; a superset relationship; and an equivalent relationship. The performing may include: generating a schema comprising information representing the one or more security controls and the at least one additional security control at one or more specified levels of granularity, wherein the information is extracted from the at least one first document and the at least one second document and is stored in the schema structured format. The steps in FIG. 8 may further include: outputting said at least one recommended additional security control to an interactive user interface, wherein the at least one recommended additional security control is implemented in the system architecture in response to user input via the interactive user interface. The at least one additional security control may be recommended based on at least one machine learning model, and the steps in FIG. 8 may further include: obtaining, via an interactive user interface, feedback pertaining to the at least one recommended additional security control, and updating the at least one machine learning model based on the feedback.

The techniques depicted in FIG. 8 can also, as described herein, include providing a system, wherein the system includes distinct software modules, each of the distinct software modules being embodied on a tangible computer-readable recordable storage medium. All of the modules (or any subset thereof) can be on the same medium, or each can be on a different medium, for example. The modules can include any or all of the components shown in the figures and/or described herein. In an embodiment of the invention, the modules can run, for example, on a hardware processor. The method steps can then be carried out using the distinct software modules of the system, as described above, executing on a hardware processor. Further, a computer program product can include a tangible computer-readable recordable storage medium with code adapted to be executed to carry out at least one method step described herein, including the provision of the system with the distinct software modules.

Additionally, the techniques depicted in FIG. 8 can be implemented via a computer program product that can include computer useable program code that is stored in a computer readable storage medium in a data processing system, and wherein the computer useable program code was downloaded over a network from a remote data processing system. Also, in an embodiment of the invention, the computer program product can include computer useable program code that is stored in a computer readable storage medium in a server data processing system, and wherein the computer useable program code is downloaded over a network to a remote data processing system for use in a computer readable storage medium with the remote system.

An embodiment of the invention or elements thereof can be implemented in the form of an apparatus including a memory and at least one processor that is coupled to the memory and configured to perform exemplary method steps.

Figure 9:
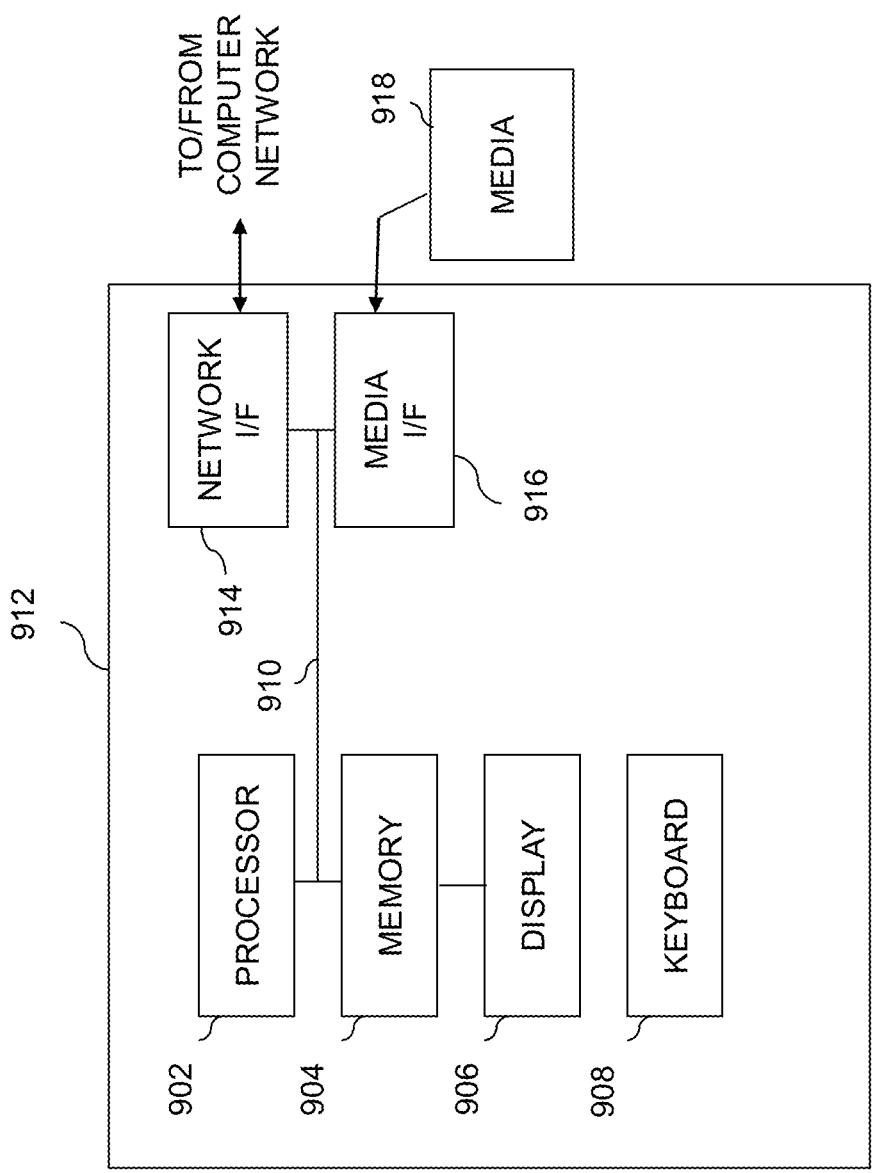
FIG. 9 is a system diagram of an exemplary computer system on which at least one embodiment of the invention can be implemented.

Additionally, an embodiment of the present invention can make use of software running on a computer or workstation. With reference to FIG. 9, such an implementation might employ, for example, a processor 902, a memory 904, and an input/output interface formed, for example, by a display 906 and a keyboard 908. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory), ROM (read only memory), a fixed memory device (for example, hard drive), a removable memory device (for example, diskette), a flash memory and the like. In addition, the phrase "input/output interface" as used herein, is intended to include, for example, a mechanism for inputting data to the processing unit (for example, mouse), and a mechanism for providing results associated with the processing unit (for example, printer). The processor 902, memory 904, and input/output interface such as display 906 and keyboard 908 can be interconnected, for example, via bus 910 as part of a data processing unit 912.

Suitable interconnections, for example via bus 910, can also be provided to a network interface 914, such as a network card, which can be provided to interface with a computer network, and to a media interface 916, such as a diskette or CD-ROM drive, which can be provided to interface with media 918.

Accordingly, computer software including instructions or code for performing the methodologies of the invention, as described herein, may be stored in associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 902 coupled directly or indirectly to memory elements 904 through a system bus 910. The memory elements can include local memory employed during actual implementation of the program code, bulk storage, and cache memories which provide temporary storage of at least some program code in order to reduce the number of times code must be retrieved from bulk storage during implementation.

Input/output or I/O devices (including, but not limited to, keyboards 908, displays 906, pointing devices, and the like) can be coupled to the system either directly (such as via bus 910) or through intervening I/O controllers (omitted for clarity).

Network adapters such as network interface 914 may also be coupled to the system to enable the data processing system to become coupled to other data processing systems or remote printers or storage devices through intervening private or public networks. Modems, cable modems and Ethernet cards are just a few of the currently available types of network adapters.

As used herein, including the claims, a "server" includes a physical data processing system (for example, system 912 as shown in FIG. 9) running a server program. It will be understood that such a physical server may or may not include a display and keyboard.

The present invention may be a system, a method, and/or a computer program product at any possible technical detail level of integration. The computer program product may include a computer readable storage medium (or media) having computer readable program instructions thereon for causing a processor to carry out embodiments of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform embodiments of the present invention.

Embodiments of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/ or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It should be noted that any of the methods described herein can include an additional step of providing a system comprising distinct software modules embodied on a computer readable storage medium; the modules can include, for example, any or all of the components detailed herein. The method steps can then be carried out using the distinct software modules and/or sub-modules of the system, as described above, executing on a hardware processor 902. Further, a computer program product can include a computer-readable storage medium with code adapted to be implemented to carry out at least one method step described herein, including the provision of the system with the distinct software modules.

In any case, it should be understood that the components illustrated herein may be implemented in various forms of hardware, software, or combinations thereof, for example, application specific integrated circuit(s) (ASICS), functional circuitry, an appropriately programmed digital computer with associated memory, and the like. Given the teachings of the invention provided herein, one of ordinary skill in the related art will be able to contemplate other implementations of the components of the invention.

Additionally, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 10:
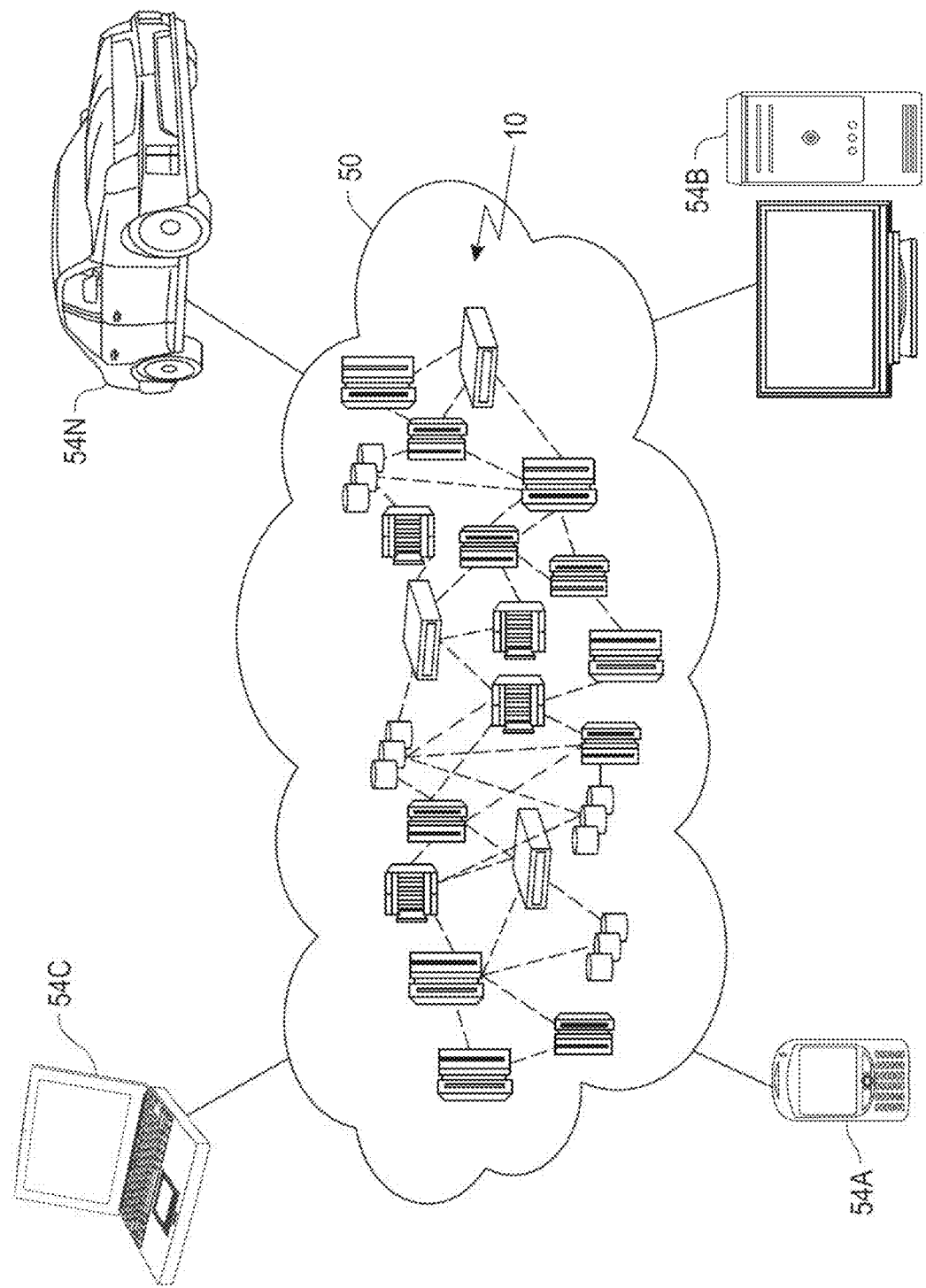
FIG. 10 depicts a cloud computing environment according to an embodiment of the present invention.

Referring now to FIG. 10, illustrative cloud computing environment 50 is depicted. As shown, cloud computing environment 50 includes one or more cloud computing nodes 10 with which local computing devices used by cloud consumers, such as, e.g., personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 10 are intended to be illustrative only and that computing nodes 10 and cloud computing environment 50 can communicate with any type of computerized device over any type of network and/or network addressable connection (e.g., using a web browser).

Figure 11:
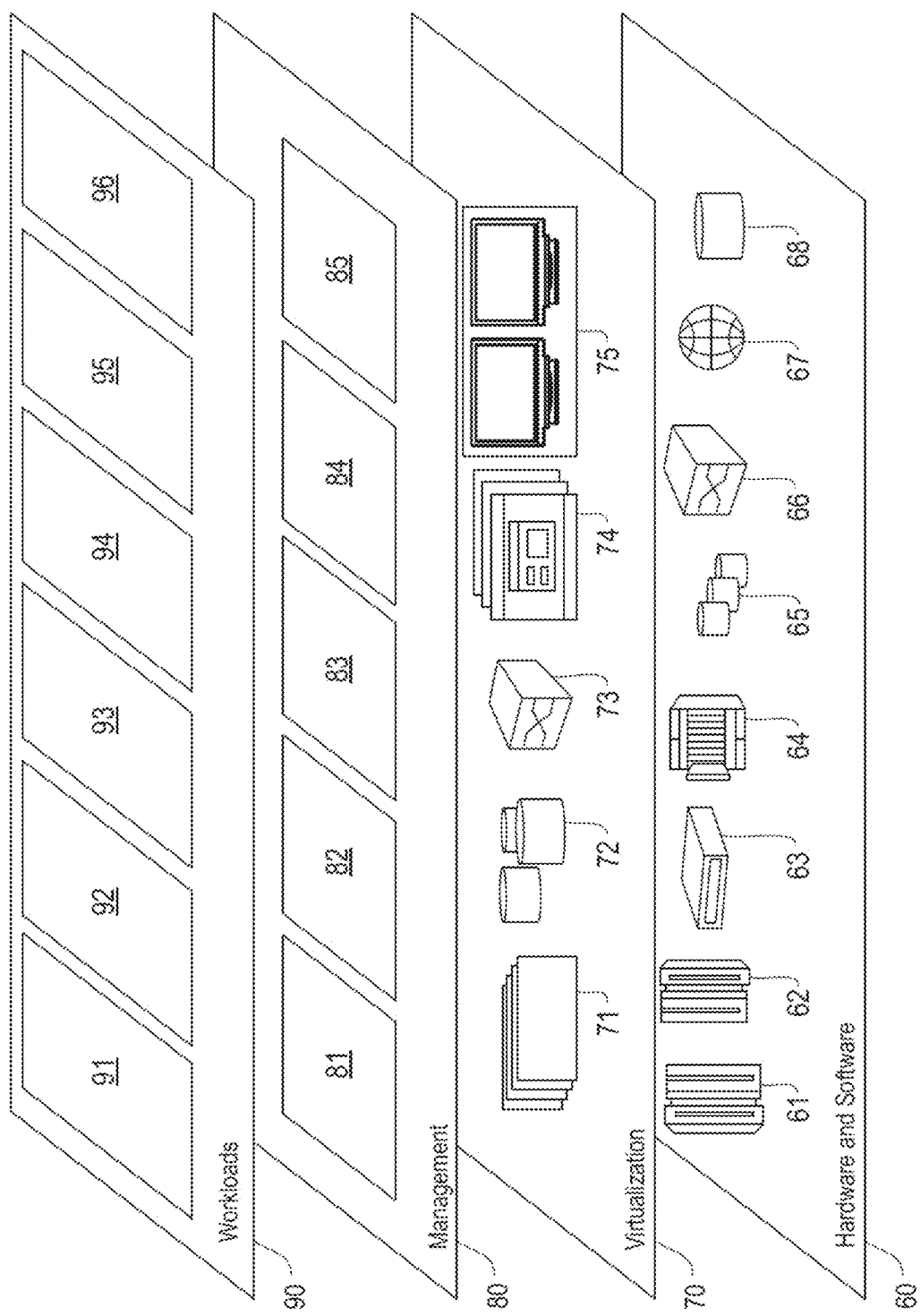
FIG. 11 depicts abstraction model layers according to an embodiment of the present invention.

Referring now to FIG. 11, a set of functional abstraction layers provided by cloud computing environment 50 (FIG. 10) is shown. It should be understood in advance that the components, layers, and functions shown in FIG. 11 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75. In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources.

In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and incremental compliance 96, in accordance with the one or more embodiments of the present invention.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of another feature, step, operation, element, component, and/or group thereof.

At least one embodiment of the present invention may provide a beneficial effect such as, for example, improving the security of systems by identifying and implementing security controls in order to satisfy certain security requirements in an automated manner. Another beneficial effect includes reducing the need to implement security controls independently, which improves the efficiency of adding necessary security controls and reduces redundant implementations of such controls.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method, the method comprising:

obtaining a first document indicative of a first set of one or more constraints, a second document indicative of a second set of one or more constraints, and a baseline document indicative of one or more security controls currently implemented in a system architecture;

performing a document comparison between the first document, the second document, and the baseline document to identify overlapping constraints between the first set of one or more constraints and the second set of one or more constraints that are not satisfied by the one or more security controls, wherein the document comparison comprises obtaining one or more coarse-grained mappings between portions of the baseline document and portions of the first document and the second document related to at least one of the security controls and generating one or more fine-grained mappings for at least a portion of the one or more coarse-grained mappings based at least in part on one or more properties extracted from the first document, the second document, and the baseline document; and recommending at least one additional security control to be implemented in said system architecture for satisfying at least one of the identified overlapping constraints;

wherein the method is carried out by at least one computing device.

2. The computer-implemented method of claim 1, wherein:

each of the coarse-grained mappings is between text related to at least one of the security controls and text related to at least one of the constraints in either the first set or the second set; and the one or more properties comprise at least one of one or more structural properties, one or more syntactic properties, and one or more semantic properties, and wherein each of the fine-grained mappings corresponds at least to one or more sub-controls of the corresponding security control.

3. The computer-implemented method of claim 2, wherein said performing comprises:

computing pairwise similarity scores for each of the fine-grained mappings based at least in part on the one or more properties; and aligning the first document and the second document based at least in part on said pairwise similarity scores.

4. The computer-implemented method of claim 3, wherein said aligning comprises performing a bipartite matching algorithm.

5. The computer-implemented method of claim 2, wherein generating the fine-grained mappings comprises:

annotating a given one of the fine-grained mappings to specify a relationship between the portions of the baseline document and the portions of the first document or the second document that correspond to the given fine-grained mapping.

6. The computer-implemented method of claim 5, wherein the relationship corresponds to a least one of:

an exact relationship;
a subset relationship;
a superset relationship; and
an equivalent relationship.

7. The computer-implemented method of claim 1, wherein said performing comprises:

generating a schema comprising information representing the one or more security controls and the at least one additional security control at one or more specified levels of granularity, wherein the information is extracted from the first document and the second document and is stored in a structured format.

8. The computer-implemented method of claim 1, comprising:

outputting said at least one recommended additional security control to an interactive user interface, wherein the at least one recommended additional security control is implemented in the system architecture in response to user input via the interactive user interface.

9. The computer-implemented method of claim 8, wherein the at least one additional security control is recommended based on at least one machine learning model, and wherein the method comprises:

obtaining, via an interactive user interface, feedback pertaining to the at least one recommended additional security control, and updating the at least one machine learning model based on the feedback.

10. The computer-implemented method of claim 1, wherein software is provided as a service in a cloud environment.

11. A computer program product comprising a computer readable storage medium having program instructions embodied therewith, the program instructions executable by a computing device to cause the computing device to:

obtain a first document indicative of a first set of one or more constraints, a second document indicative of a second set of one or more constraints, and a baseline document indicative of one or more security controls currently implemented in a system architecture;

perform a document comparison between the first document, the second document, and the baseline document to identify overlapping constraints between the first set of one or more constraints and the second set of one or more constraints that are not satisfied by the one or more security controls, wherein the document comparison comprises obtaining one or more coarse-grained mappings between portions of the baseline document and portions of the first document and the second document related to at least one of the security controls and generating one or more fine-grained mappings for at least a portion of the one or more coarse-grained mappings based at least in part on one or more properties extracted from the first document, the second document, and the baseline document; and recommend at least one additional security control to be implemented in said system architecture for satisfying at least one of the identified overlapping constraints.

12. The computer program product of claim 11, wherein:

each of the coarse-grained mappings is between text related to at least one of the security controls and text related to at least one of the constraints in either the first set or the second set; and the one or more properties comprise at least one of one or more structural properties, one or more syntactic properties, and one or more semantic properties, and wherein each of the fine-grained mappings corresponds at least to one or more sub-controls of the corresponding security control.

13. The computer program product of claim 12, wherein said performing comprises:

computing pairwise similarity scores for each of the fine-grained mappings based at least in part on the one or more properties; and aligning the first document and the second document based at least in part on said pairwise similarity scores.

14. The computer program product of claim 13, wherein said aligning comprises performing a bipartite matching algorithm.

15. The computer program product of claim 12, wherein generating the fine-grained mappings comprises:
annotating a given one of the fine-grained mappings to specify a relationship between the portions of the baseline document and the portions of the first document or the second document that correspond to the given fine-grained mapping.

16. The computer program product of claim 15, wherein the relationship corresponds to a least one of:
an exact relationship;
a subset relationship;
a superset relationship; and
an equivalent relationship.

17. The computer program product of claim 11, wherein said performing comprises:
generating a schema comprising information representing the one or more security controls and the at least one additional security control at one or more specified levels of granularity, wherein the information is extracted from the first document and the second document and is stored in a structured format.

18. A system comprising:
a memory; and
at least one processor operably coupled to the memory and configured for:
obtaining a first document indicative of a first set of one or more constraints, a second document indicative of a second set of one or more constraints, and a baseline document indicative of one or more security controls currently implemented in a system architecture;
performing a document comparison between the first document, the second document, and the baseline document to identify overlapping constraints between the first set of one or more constraints and the second set of one or more constraints that are not satisfied by the one or more security controls, wherein the document comparison comprises obtaining one or more coarse-grained mappings between portions of the baseline document and portions of the first document and the second document related to at least one of the security controls and generating one or more fine-grained mappings for at least a portion of the one or more coarse-grained mappings based at least in part on one or more properties extracted from the first document, the second document, and the baseline document; and
recommending at least one additional security control to be implemented in said system architecture for satisfying at least one of the identified overlapping constraints.

19. The system of claim 18, wherein:
each of the coarse-grained mappings is between text related to at least one of the security controls and text related to at least one of the constraints in either the first set or the second set; and
the one or more properties comprise at least one of one or more structural properties, one or more syntactic properties, and one or more semantic properties, and wherein each of the fine-grained mappings corresponds at least to one or more sub-controls of the corresponding security control.

20. The system of claim 19, wherein said performing comprises:
computing pairwise similarity scores for each of the fine-grained mappings based at least in part on the one or more properties; and
aligning the first document and the second document based at least in part on said pairwise similarity scores.

* * * * *